US009933183B1

(12) United States Patent
Den Adel

(10) Patent No.: US 9,933,183 B1
(45) Date of Patent: Apr. 3, 2018

(54) DYNAMIC INSULATED ROOF CURBS FOR USE WITH MECHANICAL UNITS

(71) Applicant: Duane Den Adel, Langley, WA (US)

(72) Inventor: Duane Den Adel, Langley, WA (US)

( * ) Notice: Subject to any disclaimer, the term of this patent is extended or adjusted under 35 U.S.C. 154(b) by 0 days.

(21) Appl. No.: 15/801,151

(22) Filed: Nov. 1, 2017

(51) Int. Cl.
| B66B 9/00 | (2006.01) |
| E04H 6/06 | (2006.01) |
| F24F 13/32 | (2006.01) |
| F16M 1/00 | (2006.01) |
| E04D 13/14 | (2006.01) |

(52) U.S. Cl.
CPC .............. F24F 13/32 (2013.01); E04D 13/14 (2013.01); F16M 1/00 (2013.01); *F24F 2221/16* (2013.01)

(58) Field of Classification Search
CPC ...... F24F 13/32; E04D 13/14; E04D 13/0315; F16M 1/00
See application file for complete search history.

(56) References Cited

U.S. PATENT DOCUMENTS

| 3,807,110 A | | 4/1974 | Kaminski | |
| 3,878,655 A | * | 4/1975 | Toth | E04B 1/98 |
| | | | | 248/559 |
| 4,598,503 A | * | 7/1986 | Berger | E04B 1/98 |
| | | | | 248/544 |
| 4,887,399 A | * | 12/1989 | Berger | F24F 13/24 |
| | | | | 248/678 |
| 5,553,425 A | * | 9/1996 | Sampson | E04D 13/0315 |
| | | | | 52/198 |
| 5,678,381 A | | 10/1997 | Denadel | |
| 5,896,711 A | | 4/1999 | McClure | |
| 6,067,759 A | | 5/2000 | House | |
| 6,151,838 A | | 11/2000 | Husein | |
| 7,065,928 B1 | | 6/2006 | Lane | |
| 7,493,729 B1 | | 2/2009 | Semmes | |

(Continued)

FOREIGN PATENT DOCUMENTS

| CA | 795138 | 9/1968 |
| CA | 2261441 | 5/2000 |

(Continued)

*Primary Examiner* — Brian D Mattei
(74) *Attorney, Agent, or Firm* — Thomas E. Loop

(57) ABSTRACT

A structurally reinforced insulated dynamic roof curb for securely fastening a mechanical unit thereon is disclosed. The structurally reinforced insulated dynamic roof curb is generally comprised of a plurality of sheet-metal capture tracks positioned on the roof to define a generally rectangular or square configuration, a plurality of structurally reinforced insulated sheet-metal encased support members positioned within the plurality of capture tracks, a plurality of vertically extending support tubes joined together with a plurality of spanning cross-support tubes within the encased support members, wherein the cross-support tubes span between the vertically extending support tubes, and wherein the vertically extending support tubes are spaced apart and positioned along the length of the insulated sheet-metal encased support member thereby defining the structurally reinforced insulated dynamic roof curb. A mechanical unit is fastened onto optional seismic isolators that are selectively positioned on the top surfaces of the structurally reinforced insulated dynamic roof curbs.

3 Claims, 5 Drawing Sheets

(56) References Cited

U.S. PATENT DOCUMENTS

| | | | |
|---|---|---|---|
| 2003/0182873 A1* | 10/2003 | Clasen | F24F 13/32 52/73 |
| 2006/0070316 A1* | 4/2006 | Lewis | E04D 13/031 52/200 |
| 2007/0113506 A1 | 5/2007 | DenAdel | |
| 2009/0260310 A1 | 10/2009 | DenAdel | |
| 2010/0139186 A1 | 6/2010 | Laremore | |
| 2011/0073017 A1* | 3/2011 | Wilson, Jr. | F24F 1/60 108/42 |
| 2013/0087677 A1* | 4/2013 | Pooler | F24F 13/32 248/575 |
| 2014/0075980 A1* | 3/2014 | Villar | F24F 13/32 62/297 |
| 2015/0068133 A1* | 3/2015 | Den Adel | E04D 13/1687 52/15 |
| 2016/0201842 A1* | 7/2016 | Wang | F16B 7/18 248/678 |

FOREIGN PATENT DOCUMENTS

| | | |
|---|---|---|
| CA | 2280222 | 7/2000 |
| GB | 143585 | 5/1920 |
| GB | 2180566 | 4/1987 |
| WO | 2004063632 A2 | 7/2004 |

* cited by examiner

DYNAMIC INSULATED ROOF CURBS FOR USE WITH MECHANICAL UNITS

TECHNICAL FIELD

The present invention relates generally to building construction and, more particularly, to beams and/or curb structures used on roofs (and other like platform structures) to securely fasten mechanical units thereon.

BACKGROUND OF THE INVENTION

In the building construction industry, there is often a need to securely fasten heavy duty mechanical units (e.g., a heating, ventilation and/or cooling (HVAC) system) onto roofs or other like elevated platform structures. For example, some building construction projects call for the installation of a rooftop mechanical unit that weighs in excess of 50,000 lbs. (and having dimensions of about 40' (L)×15' (W)×10' (H)).

Although a variety of structures are known in the building construction trade, there is still a need in the art for new and improved dynamic roof curbs for use with heavy mechanical units—roof curbs that are easy to construct/install on-site. The present invention fulfills these needs and provides for further related advantages.

SUMMARY OF THE INVENTION

In brief, the present invention in one embodiment is directed to a structurally reinforced insulated dynamic roof curb for securely fastening a mechanical unit thereon. The structurally reinforced insulated dynamic roof curb is generally comprised of (i) a plurality of sheet-metal capture tracks positioned on the roof so as to define a generally rectangular or square configuration (shape), (ii) a plurality of structurally reinforced insulated sheet-metal encased support members positioned within the plurality of capture tracks, and (iii) a plurality of vertically extending support tubes joined together with a plurality of spanning cross-support tubes within sheet-metal encased support members, wherein the cross-support tubes span between the vertically extending support tubes, and wherein the vertically extending support tubes are spaced apart and positioned along the length of the insulated sheet-metal encased support member thereby defining the structurally reinforced insulated dynamic roof curbs. A mechanical unit is fastened onto a plurality of optional seismic isolators (in the form of vertically aligned coil springs) that are selectively positioned on the top portion of the structurally reinforced insulated dynamic roof curbs.

These and other aspects of the present invention will become more evident upon reference to the following detailed description and attached drawings. It is to be understood, however, that various changes, alterations, and substitutions may be made to the specific embodiments disclosed herein without departing from their essential spirit and scope.

BRIEF DESCRIPTION OF THE DRAWINGS

In the drawings like reference numerals are used to designate like features throughout the several views of the drawings.

DETAILED DESCRIPTION OF THE INVENTION

Figure 1:
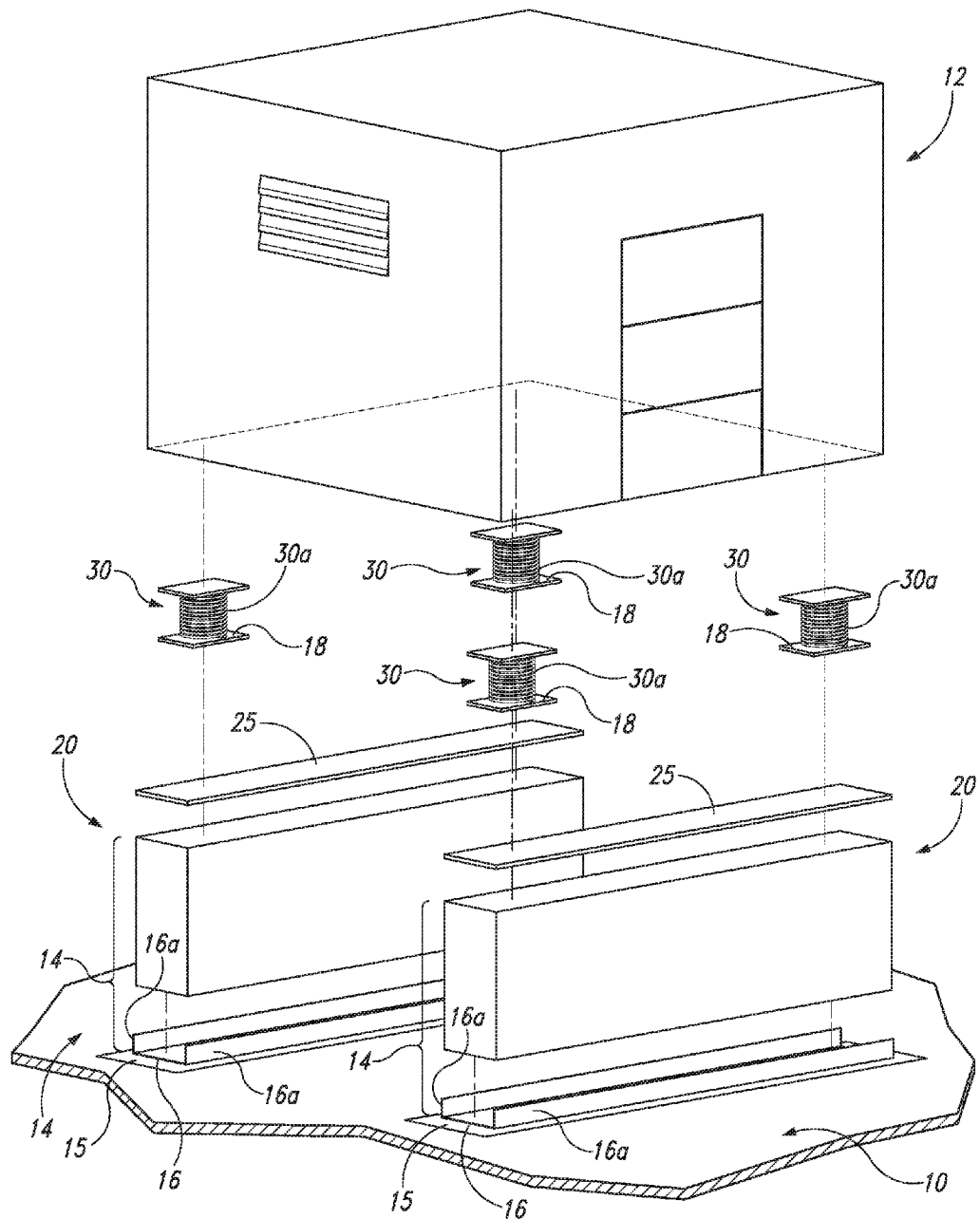
FIG. 1 is an elevated side perspective partially transparent and exploded view of a pair of dynamic insulated roof curbs positioned on, and in combination with, a roof and having a mechanical unit thereon in accordance with an embodiment of the present invention.
Figure 2A:
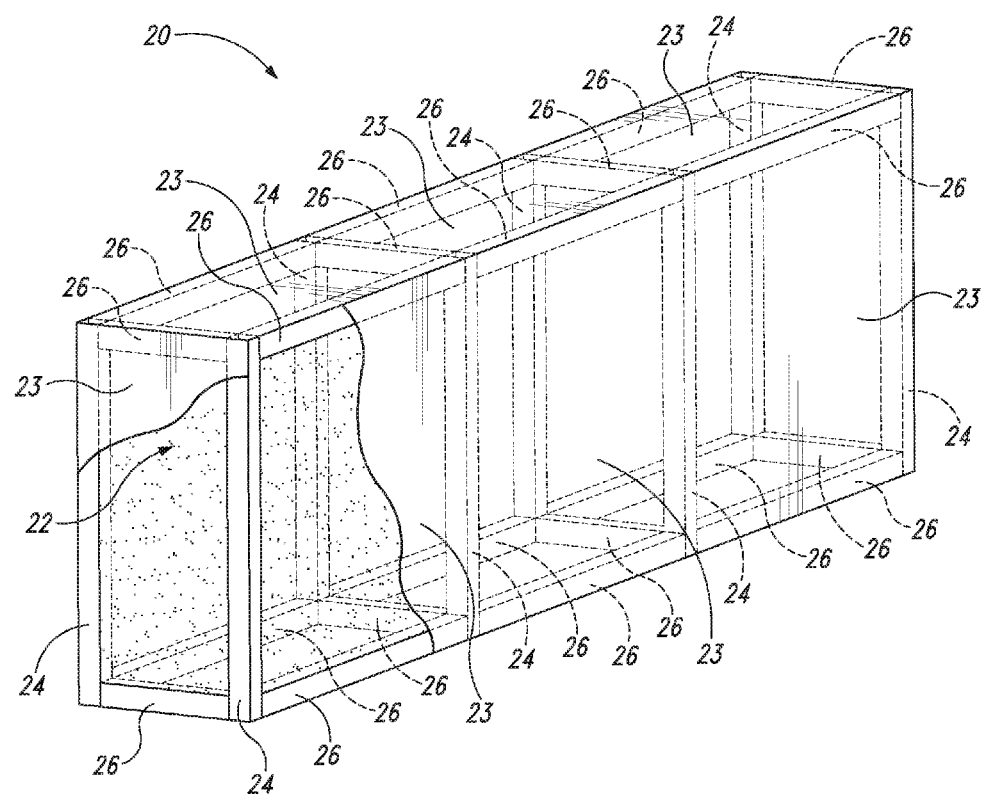
FIG. 2A is a side perspective partially transparent view a single structurally reinforced insulated sheet-metal encased support member that includes a plurality of vertically extending support tubes joined together with a plurality of spanning cross-support tubes, wherein the cross-support tubes span between the vertically extending support tubes, and wherein the vertically extending support tubes are spaced apart and positioned along the length of the insulated sheet-metal encased support member thereby defining the structurally reinforced insulated dynamic roof curb in accordance with an embodiment of the present invention.
Figure 2B:
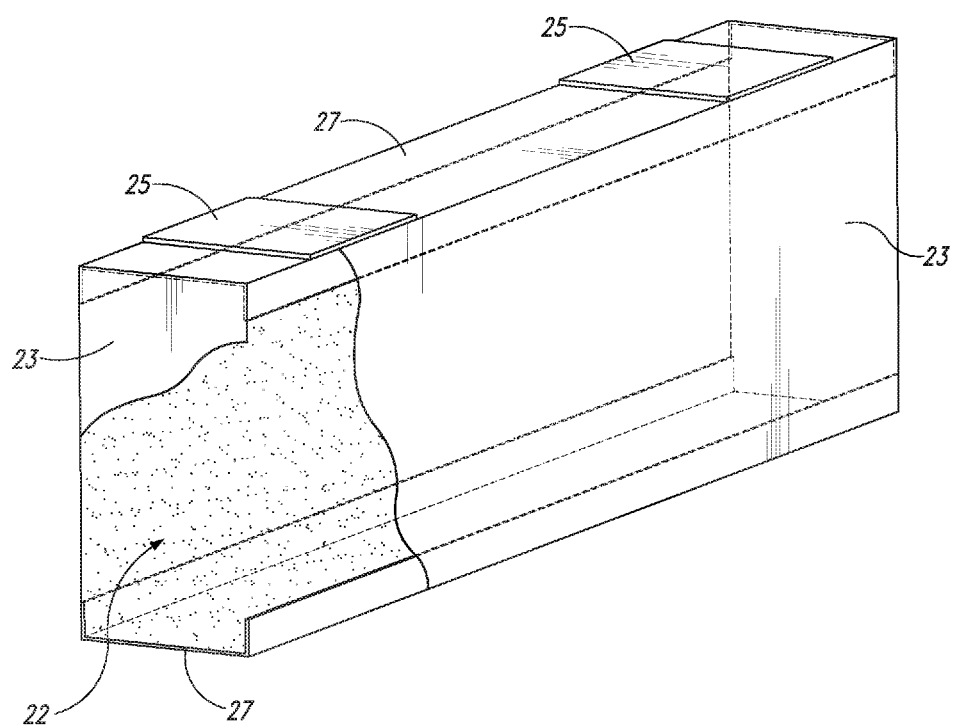
FIG. 2B is a side perspective partially transparent view a single structurally reinforced insulated sheet-metal encased support member that has no support tubes in accordance with another embodiment of the present invention.
Figure 3A:
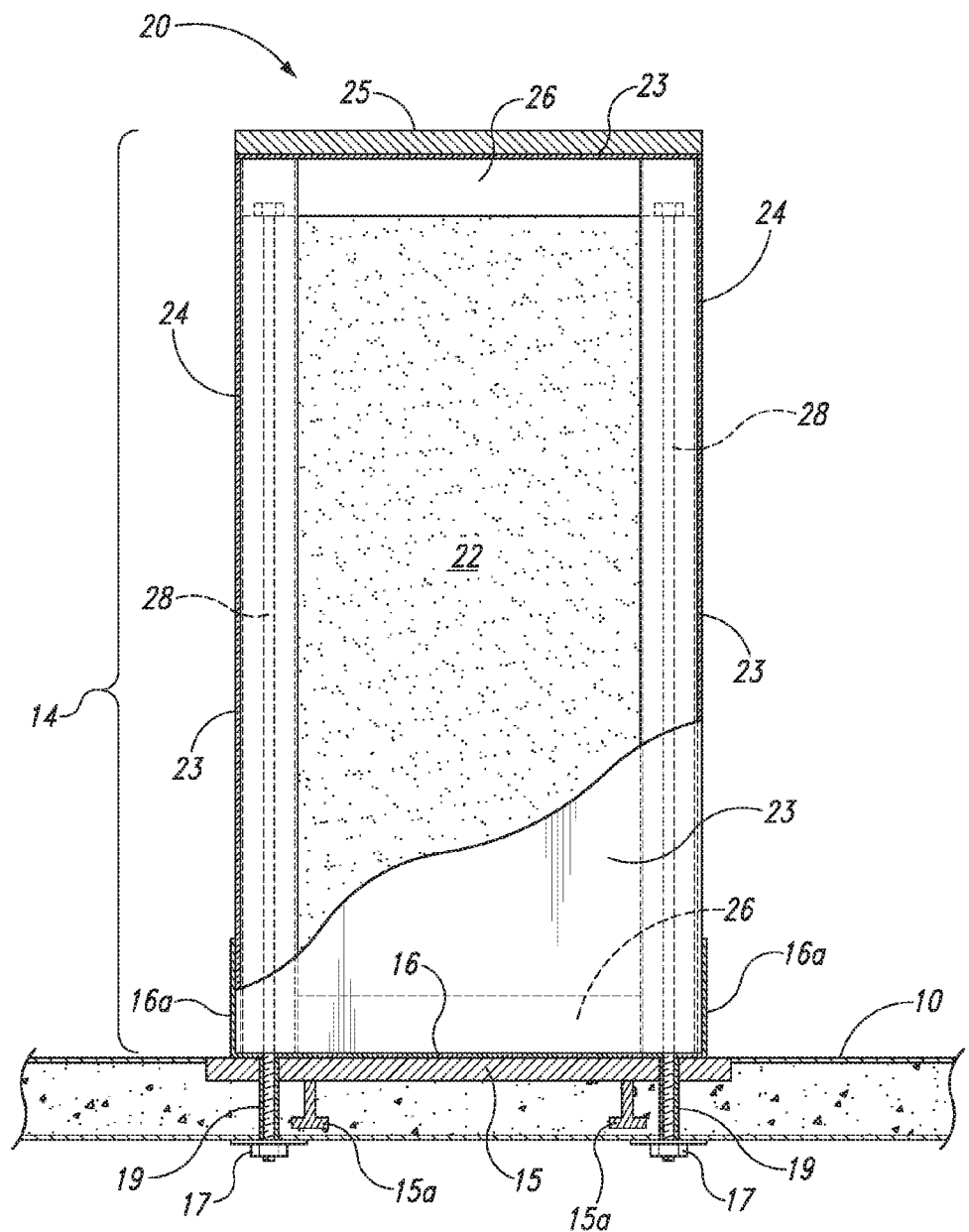
FIG. 3A is an end partially transparent view of the structurally reinforced insulated sheet-metal curb shown in FIG. 2A and shows a plurality of rods extending through the plurality of vertically extending support tubes and roof with embed plates and fastening the structurally reinforced insulated dynamic roof curb to the roof.
Figure 3B:
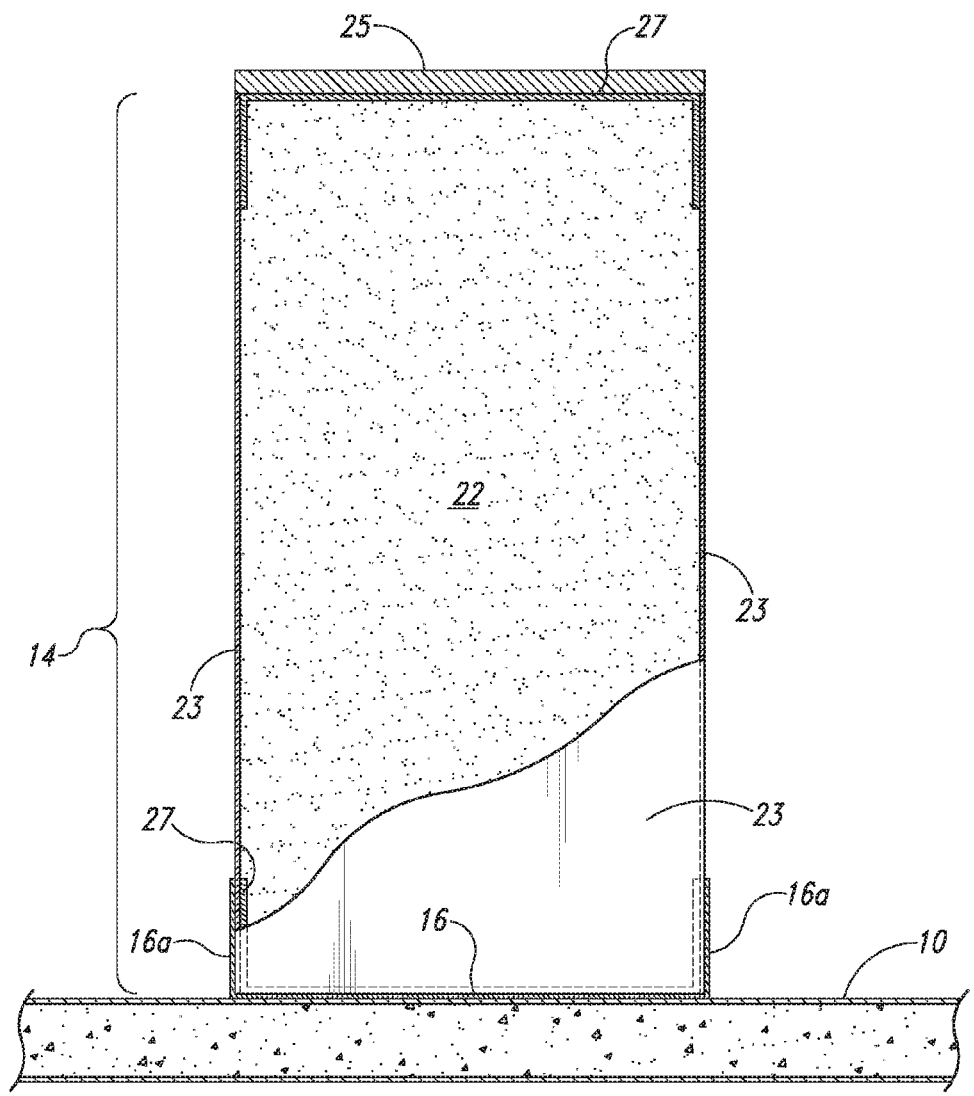
FIG. 3B is an end partially transparent view of the structurally reinforced insulated sheet-metal curb shown in FIG. 2B and shows the structurally reinforced insulated dynamic roof curb to the roof fastened to the roof without top or embed plates.

Referring now to the drawings wherein like references are used to designate like features and, more particularly, to FIGS. 1-3, the present invention in a first embodiment is directed to, in combination, a roof 10 and a mechanical unit 12 that is positioned on at least a pair of structurally reinforced insulated dynamic roof curbs 14. (As used herein, the term "roof curbs" or "roof curb" refers to the rectangular box structure that is affixed to the roof at a selected location, which may or may not be near an edge of the roof.) The structurally reinforced insulated dynamic roof curbs 14 comprise: a plurality of sheet-metal capture tracks 16 positioned on the roof 10 in a way that defines a generally rectangular or square configuration or shape (as best shown in FIG. 1). Each capture track 16 includes along its length a pair of opposing and upwardly extending receiving flanges 16a. As shown, a plurality of structurally reinforced insulated sheet-metal encased support members 20 are positioned within the plurality of capture tracks 16 between the pairs of receiving flanges 16a. Each structurally reinforced insulated sheet-metal encased support member 20 has an interior space (as best shown in FIG. 2A) that is filled with an insulating foam material 22 and covered by sheet-metal 23, and wherein the interior space of each structurally reinforced sheet metal encased support member 20 also includes a plurality of vertically extending support tubes 24 joined together with a plurality of spanning cross-support tubes 26 (that may horizontally and/or diagonally positioned). The cross-support tubes 26 span between the vertically extending support tubes 24. The vertically extending support tubes 24 are spaced apart and positioned along the length of the insulated sheet-metal encased support member 20. The structurally reinforced insulated sheet-metal encased support members 20, together with the corresponding capture tracks 16, define the structurally reinforced insulated dynamic roof curbs 14.

In an alternative embodiment and as best shown in FIG. 2B, each structurally reinforced insulated sheet-metal encased support member 20 having an interior space filled with an insulating foam material 22 may be in the form of two opposing and spaced apart cold-formed U-shaped steel tracks 27 surrounded on all sides by sheet-metal 23. In this alternative embodiment, the structurally reinforced insulated sheet-metal encased support members 20, together with the corresponding capture track 16, define the structurally reinforced insulated dynamic roof curbs 14.

As best shown in FIG. 3A and in accordance with the first embodiment, a plurality of rods 28 extend through the plurality of vertically extending support tubes 24 and roof 10 and securely fasten the structurally reinforced insulated dynamic roof curbs 14 to the roof 10. As shown, the structurally reinforced insulated dynamic roof curb 14 are positioned on a plurality of steel embed plates 15 positioned on, or embedded into (with the aid of downwardly protruding metal studs 15*a*), the roof 10 to define a generally rectangular or square configuration. The plurality of rods 28 are generally secured underneath the roof 10 with the aid of support bottom plates and fasteners 17 (one for each of the rods 28), and protective vinyl sleeves 19 are generally used (in the through-holes that go through the roof 10). To better enable the acceptance of mechanical unit 10, a plurality of steel top plates 25 are positioned on top of the structurally reinforced insulated dynamic roof curbs 14. The steel embed plates 15 and the steel top plates 25 may preferably each have a thickness of about ½ inch.

As best shown in FIG. 1, a plurality of seismic isolators 30 are selectively positioned on the top surfaces of pads 18 that have been positioned on top surfaces the structurally reinforced insulated dynamic roof curbs 14. The mechanical unit 12 is fastened onto the plurality of seismic isolators 30. The plurality of seismic isolators 30, in turn, each comprise at least one vertically aligned coil spring 30*a*.

In accordance with the present invention, each structurally reinforced insulated sheet-metal encased support member 20 may also generally consists of a pair of confronting C-shaped and/or U-shaped sheet metals studs positioned about (1) a foamed polymer core (e.g., a polystyrene, polyurethane, polypropylene, and/or a polyethylene foam), and/or (2) a mineral fiber core (e.g., ROCKWOOL mineral wool insulation). In other words, each structurally reinforced insulated sheet-metal encased support member 20 may also consists generally or essentially of a pair of confronting C-shaped and/or U-shaped sheet metals studs sandwiching a centrally positioned foamed polymer (plastic) and/or mineral fiber core. The foamed polymer and/or mineral fiber core serves as insulation (dampening) for both sound and vibrations. The foamed polymer and/or mineral fiber core is generally glued into place by use of a urethane adhesive, for example, which adds additional strength and durability.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. In combination with a roof, a mechanical unit on at least a pair of structurally reinforced insulated dynamic roof curbs, comprising:

a plurality of steel plates positioned on, or embedded into, the roof to define a generally rectangular or square configuration;

a plurality of sheet-metal capture tracks positioned on the plurality of steel bottom plates, wherein each capture track includes along its length a pair of opposing and upwardly extending receiving flanges;

a plurality of structurally reinforced insulated sheet-metal encased support members positioned within the plurality of capture tracks between the pairs of receiving flanges, wherein each structurally reinforced insulated sheet-metal encased support member has an interior space that is filled with an insulating foam material, and wherein the interior space of each structurally reinforced sheet-metal encased support member also includes a plurality of vertically extending support tubes joined together with a plurality of spanning cross-support tubes, wherein the cross-support tubes span between the vertically extending support tubes, and wherein the vertically extending support tubes are spaced apart and positioned along the length of the insulated sheet-metal encased support member thereby defining the structurally reinforced insulated dynamic roof curbs;

a plurality of rods extending through the plurality of vertically extending support tubes and fastening the structurally reinforced insulated dynamic roof curbs to the roof;

a plurality of steel top plates positioned on the structurally reinforced insulated dynamic roof curbs; and the mechanical unit fastened to the structurally reinforced insulated dynamic roof curbs.

2. The structurally reinforced insulated dynamic roof beams in accordance with claim 1, further comprising, a plurality of seismic isolators selectively positioned on top of the plurality of steel top plates, and wherein the mechanical unit is fastened onto the plurality of seismic isolators.

3. The structurally reinforced insulated dynamic roof curbs in accordance with claim 2 wherein each seismic isolator comprises at least one vertically aligned coil spring.

* * * * *